United States Patent [19]

Schwartz et al.

[11] 4,387,499
[45] Jun. 14, 1983

[54] LEADER TO HUB LOCKING SYSTEM

[75] Inventors: Vern R. Schwartz; Bernard D. Benz, both of Sunnyvale, Calif.

[73] Assignee: Verbatim Corporation, Sunnyvale, Calif.

[21] Appl. No.: 765,130

[22] Filed: Feb. 3, 1977

[51] Int. Cl.³ .............................................. B23P 19/02
[52] U.S. Cl. ................................. 29/564.6; 24/243 K; 29/235; 29/564.1; 29/806; 242/74
[58] Field of Search ................. 29/235, 244, 451, 267, 29/33 K, 271, 450, 564.6, 564.1, 806; 242/74, 74.2; 83/375; 72/129, 131; 24/243 K

[56] References Cited

U.S. PATENT DOCUMENTS

| | | | |
|---|---|---|---|
| 1,368,415 | 2/1921 | Tanner | 242/74.2 |
| 2,204,928 | 6/1940 | Culver | 24/243 K |
| 3,256,597 | 6/1966 | Brudney | 29/435 |
| 3,620,469 | 11/1971 | Riedel et al. | 242/74 |
| 3,981,066 | 9/1976 | Calvert | 29/451 |
| 4,247,977 | 2/1981 | Nakamura | 29/806 X |

Primary Examiner—William R. Briggs
Assistant Examiner—Jerry Kearns
Attorney, Agent, or Firm—Freilich, Hornbaker, Wasserman, Rosen & Fernandez

[57] ABSTRACT

Apparatus for installing a tape leader on a hub, including a resilient locking member which can be projected into an undercut slot in the hub to press in a portion of the tape leader and lock it therein. A punch moves the locking member towards the hub slot, while a pair of pivotally mounted compressors move along opposite sides of the locking member to compress it and guide it into the hub slot.

9 Claims, 6 Drawing Figures

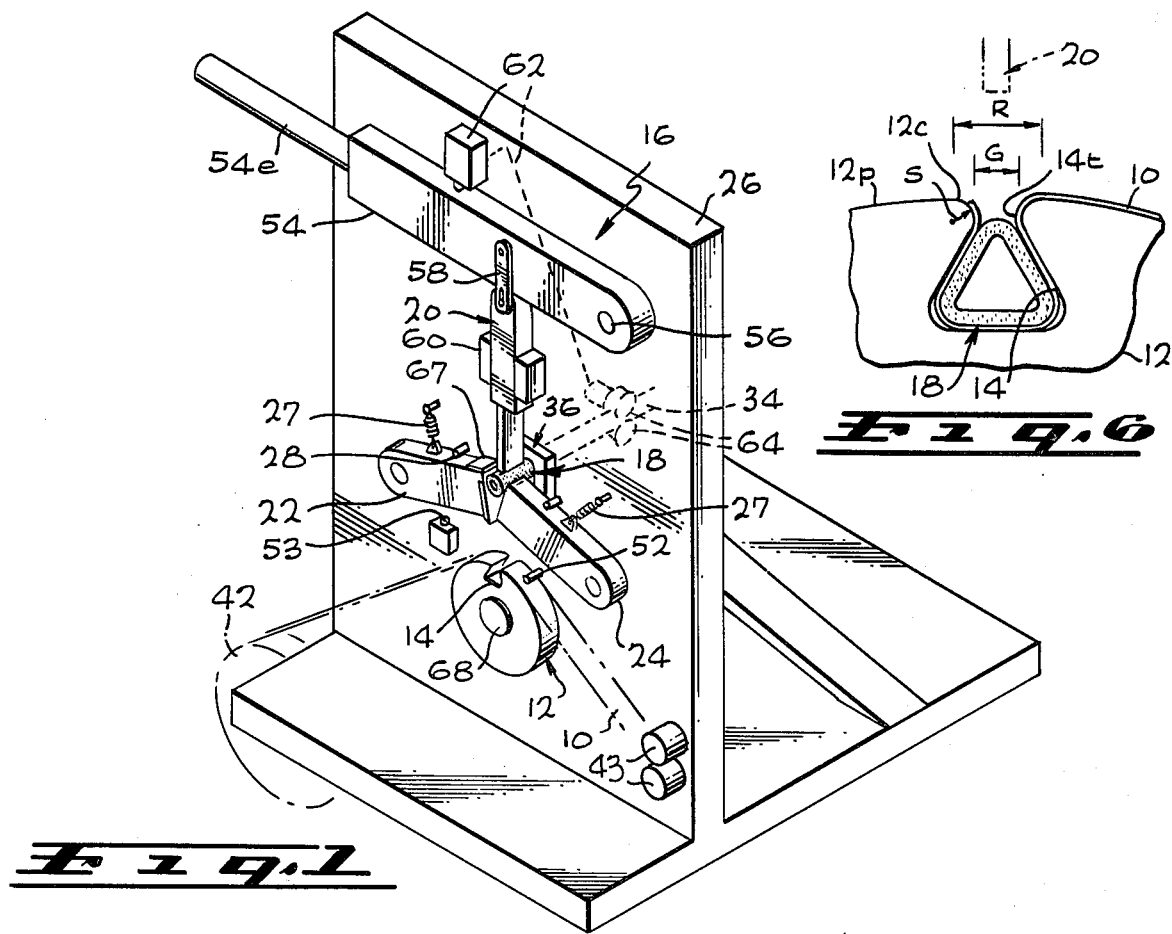
Fig. 1
Fig. 6
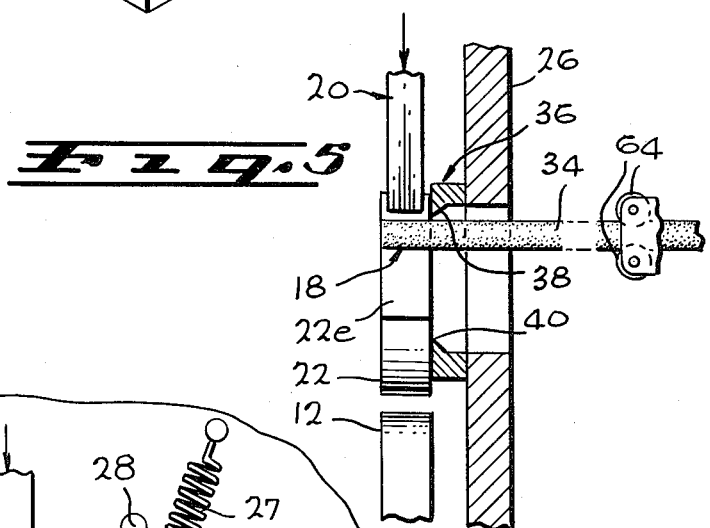
Fig. 5
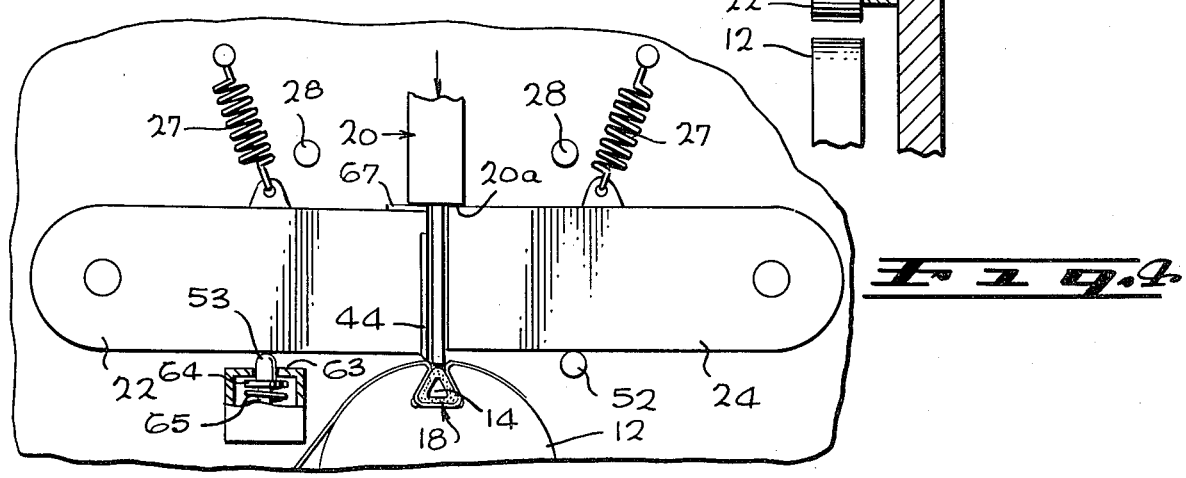
Fig. 4

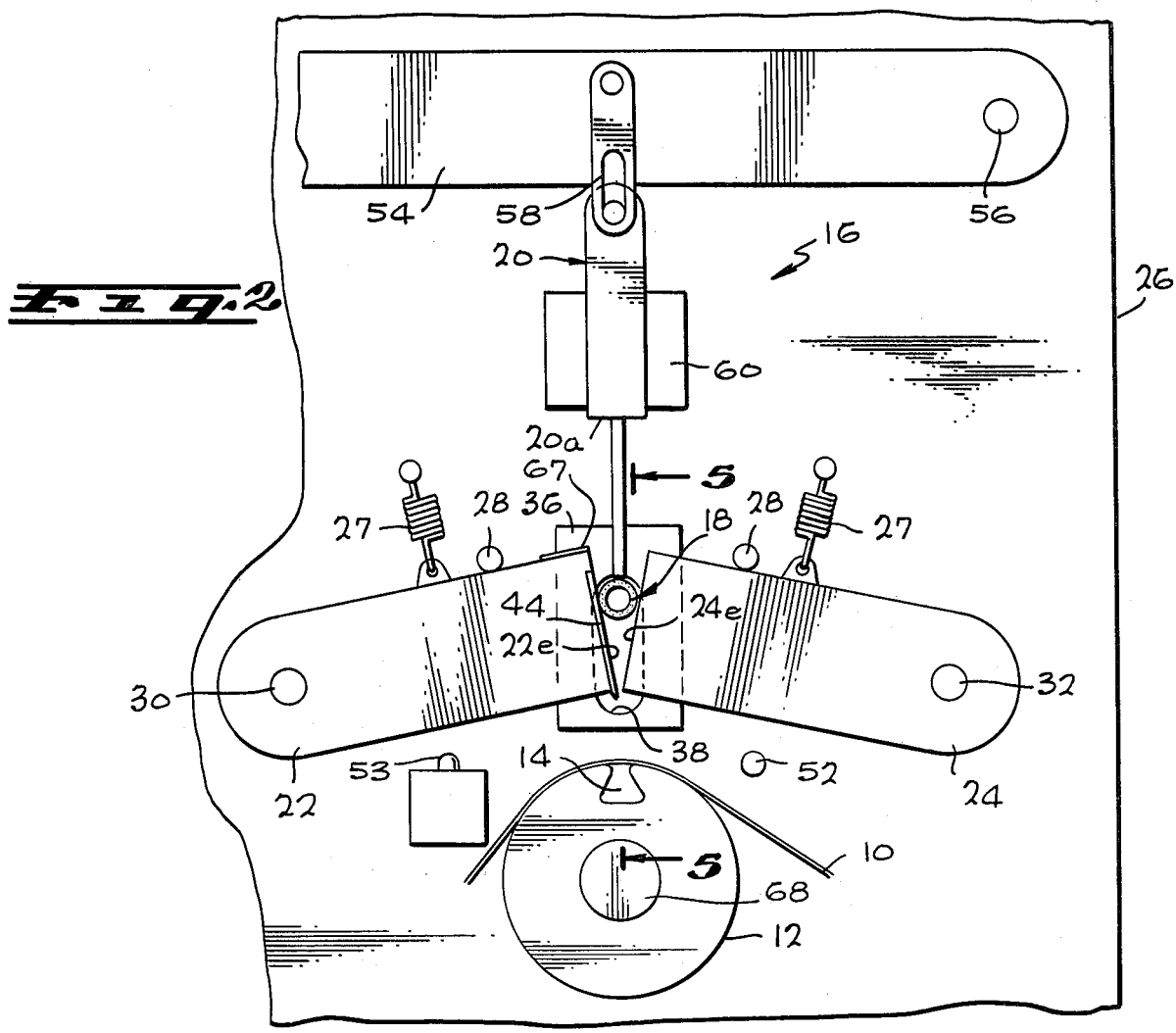

LEADER TO HUB LOCKING SYSTEM

BACKGROUND OF THE INVENTION

This invention relates to recording tape cartridges, reels, and the like, and to apparatus and methods for installing a tape leader on a hub.

The manufacture of a tape cartridge or the like normally involves the attachment of one end of a tape leader to a hub, the other end of the tape leader being attached to the magnetic recording tape. The hub is typically formed by injection molding, and therefore can be formed even in a complex manner to facilitate locking in of the leader, without requiring substantially increased costs in the manufacture of the hub. A hub locking system which could take advantage of the ease of the forming the hub to permit the installation of a tape leader in a simple and relatively inexpensive manner, would facilitate the manufacture of tape cassettes and the like at lower cost.

SUMMARY OF THE INVENTION

In accordance with one embodiment of the present invention, a tape leader installation system is provided which enables the fastening of a tape leader onto a hub in a simple and low-cost manner. The hub is constructed with an undercut slot in its periphery, and a resilient member is provided to push a section of the leader into the hub slot and lock it therein. Apparatus for installing the locking member and tape leader includes a punch which moves the locking member towards the hub slot, and a pair of compressing arms, or compressors, located on either side of the locking member. The compressors are pivotally mounted so that the resilient locking member initially enters between the compressors at a location where they are spaced considerably apart. As the punch moves the locking member, the locking member causes the compressors to pivot to squeeze the locking member so it can enter the hub slot, the compressors also serving to guide the locking member towards the slot.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of a leader installing apparatus constructed in accordance with the present invention, with a portion thereof shown in phantom lines;

FIG. 2 is a partial front view of the apparatus of FIG. 1;

FIG. 3 is a view of a portion of the apparatus of FIG. 2, shown at a later stage in its operations;

FIG. 4 is a view similar to FIG. 3, but showing the apparatus at a still later stage in its operation;

FIG. 5 is a view taken on the line 4—4 of FIG. 2; and

FIG. 6 is an enlarged view of a portion of the hub of FIG. 1.

DESCRIPTION OF THE PREFERRED EMBODIMENT

As best illustrated in FIG. 1, a tape leader 10 is installed on a hub 12 with an undercut slot 14 by an installing apparatus 16. The installing apparatus moves a compressed resilient locking member 18 against the tape leader 10, and then presses both of them into the undercut slot 14, the locking member then expanding to lock itself and the leader into the slot. The installation apparatus includes a punch 20 which forces the locking member into the slot, and a pair of compressing arms or compressors 22, 24, which squeeze the locking member to facilitate its entry into the narrow top of the undercut slot. The punch and compressors are mounted on a frame 26.

As shown in FIGS. 2 and 3, the compressors 22, 24 are biased upwardly by a pair of springs 27 against a pair of stops 28. In this position, the locking member 18 can be fed to a position between the compressors 22, 24 and under the punch 20. It can be seen that the outer ends 22e, 24e of the compressors form a tapered space, so that when the punch 20 pushes down the locking member 18, the locking member becomes caught between the ends of the compressors. The inner ends of the compressors are pivotally mounted on axes 30, 32 which lie below the initial position of the locking member 18, so that as the punch pushes the locking member down towards the hub slot, the compressors pivot to compress the locking member. At 18a in FIG. 3, the locking member is shown fully compressed, which occurs when it reaches a position at the same level as the axes 30, 32 of the compressors, for the particular compressors illustrated. The lower end portion 20e of the punch is narrow enough to fit between the compressors at this orientation. The punch 20 continues to move down to slide the locking member at 18a between the ends of the compressors and into the undercut slot 14 of the hub 12. The locking member 18 has a width, when uncompressed, which is much greater than the width of the top of the hub slot. When the locking member 18 is installed in the hub slot, it expands and is reformed to assume the general shape of the undercut slot 14, to lock in the tape leader 10.

The locking member 18 is a segment of a long tube 34 (FIG. 5) of elastomeric material. The installing apparatus includes a plate 36 with a guide hole 38, and with walls forming a cut-off blade 40 at the lower end of the slot. The guide hole 38 helps guide the end of the tube 34 while it moves forwardly to a position between the compressors, and then downwardly as the tube end moves towards the hub slot, until the front end of the tube which forms the locking member 18 is cut off from the rest of the tube by the cut-off blade portion 40. In the course of downward movement of the locking member, the compressors 22, 24 firmly engage the locking member to thereafter guide it in movement towards the hub slot while also compressing it.

The tape leader material can be initially contained in a large roll 42 and held over the hub slot by holding means formed by roll 42 and rollers 43, and after each installation of a tape leader portion, the web of material is cut. Such cutting is accomplished by a leader cutting blade 44 (FIG. 2) mounted on and protruding down from the end 22e of one of the compressor arms. As the compressors pivot down, one compressor 24 encounters a stop pin 52 that is anchored to the machine frame, while the other encounters a pin 53. The pin 53 (FIG. 4) is upwardly biased by a spring 65, but is restrained by a collar 64 from protruding more than a few thousandths inch above a plate 63. Although the compressors are stopped by pins 52, 53, the punch 20 continues to move down until a body portion 20a of the punch abuts a shim 67 on the compressor 22. The downward force of the punch body portion 20a on the shim 67 is greater than biasing of the spring 65, so the compressor 22 and the blade 44 thereon move down a few thousandths inch. The blade 44 presses against the tape leader 10 while the hub 12 acts as an anvil, to thereby cut the tape leader. In this manner, a complete tape leader portion is attached to the hub 12.

Two mechanisms are basically required to press the locking member into the hub, these being an apparatus for moving the punch 20 down and up and an apparatus for advancing the rod 34 of elastomeric material once in each cycle of operation. As shown in FIG. 1, an arm 54 is provided which is pivotally mounted at 56 on the frame of the installation apparatus, and which is coupled by links 58 to the punch 20. An operator grasps an end 54e of the arm and presses it down to push down the punch 20. When the operator lifts up the arm 54e, the links 58 pull up the punch, which is guided in up and down movement by a pair of guides 60. As the arm 54 approaches its upward position, it moves an advancing mechanism 62 which is coupled to one of a pair of rollers 64 that engage the tube 34 of elastomeric material, to advance the tube so that its end lies under the punch. In this manually operated mechanism, the operator, after lifting the arm 54, pulls out a length of the leader 10 and inserts a new hub 12 onto a shaft 68. The operator then begins another cycle by moving down the arm 54. Of course, it is possible to utilize motors powered by electricity or the like, to move down the punch 20, advance the tube 34, advance the leader 10, and install the hubs 12. The downward movement of the punch 20 and advancement of the tube 34 can be performed by a fairly simple power driven mechanism.

A variety of resilient locking member constructions can be utilized, instead of those formed from a tube of elastomeric material. For example, it is possible to utilize compressible members that are solid instead of tubular, that are triangularly or otherwise shaped when uncompressed, that are constructed from metal, that are constructed of a plastic with a memory, or that must be heated to permit compression. Of course, the members can be earlier formed individually instead of being cut from a rod or tube. The undercut slot normally should be noncircular, in order to resist turning of the locking member therein which could allow the tape leader to be pulled out. A substantially triangular slot, as illustrated, is efficient in preventing loss or rotation of the locking member. Of course, the slot does not have to be uniform all across the thickness of the hub.

The use of a slot 14 which opens to the periphery of the hub could lead to a "flat" spot in the layers of tape to be wound on the hub. However, it has been found that with a typical Mylar tape leader 10 of about 3 mil (thousandth of an inch) thickness no flat spot occurs if the unsupported distance R (FIG. 6) or recess in the circular periphery 12p of the hub, is no more than about 50 mil. The particular undercut slot 14 is formed with its throat 14t of a width of about 34 mil, and with the corners 12c of the opening having a radius of curvature S of about 10 mil, to provide a recess of a width R of about 50 mil.

Thus, the invention provides a relatively simple apparatus for installing a tape leader on a hub. This is accomplished by the use of a resilient locking member which presses a section of a tape leader into an undercut slot formed in a hub. The locking member is compressed, to easily fit into the undercut slot, by a pair of compressors, which are moved together by reason of frictional engagement with the locking member which is moving towards the hub slot. The locking member can be supplied as a portion of a tube of elastomeric material, with the end of the tube being cut off as it approaches the hub slot.

Although particular embodiments of the invention have been described and illustrated herein, it is recognized that modifications and variations may readily occur to those skilled in the art and consequently, it is intended that the claims be interpreted to cover such modifications and equivalents.

We claim:

1. Apparatus for installing a tape leader on a hub that has an undercut slot comprising:
    a locking member of resilient material having a greater uncompressed width than the top of said slot in said hub;
    a punch moveable toward said hub slot to press said locking member into said hub slot;
    a pair of compressors on either side of the path of said punch, said compressors holding said locking member compressed at a location adjacent to said slot to permit said punch to press said locking member into said slot; and
    means for holding said tape leader over said hub slot, in the path of said locking member, so that as the locking member enters the slot it pushes a portion of the leader into the slot to lock it therein under the locking member.

2. Apparatus for installing a resilient locking member and a portion of a tape leader into the undercut slot of a hub, comprising:
    means for holding said hub;
    means for holding said tape leader over said hub slot;
    a punch moveable toward said slot in said hub;
    a pair of compressors having inner ends pivotally mounted at a predetermined pair of axes, and having outer ends lying on either side of the path of said punch and having portions which are closer together than the uncompressed width of said locking member; and
    spring means urging said compressors to pivot so their outer ends move away from said hub;
    said spring means supplying a bias low enough that said compressors pivot to move their outer ends towards said hub, when said locking member lies between said compressor portions and is forced by said punch towards said hub slot.

3. The apparatus described in claim 2 including:
    means for feeding an elongated rod of resilient material between said compressing members; and
    a cutting blade located beside the path of said punch to cut off the end of said rod which lies between said compressors to form said locking member, as said rod end moves towards said hub slot.

4. Apparatus for installing a tape leader on a hub that has an undercut slot, comprising:
    means for holding the tape leader over the hub slot;
    a pair of compressing means for pressing on opposite sides of a resilient locking member to establish it at a reduced width at a location adjacent to said hub slot but on a side of said tape leader which is opposite said slot; and
    means for pressing said resilient member from between said pair of compressing means and against the tape leader into said slot.

5. Apparatus for installing a tape leader on a hub that has an undercut slot comprising:

a locking member of resilient material having a greater uncompressed width than the top of said slot in said hub;

a punch moveable toward said hub slot to press said locking member into said hub slot;

a pair of compressors on either side of the path of said punch, for holding said locking member compressed at a location adjacent to said slot to permit said punch to press said locking member into said slot; and means for holding said tape leader over said hub slot, in the path of said locking member, so that as the locking member enters the slot it pushes a portion of the leader into the slot to lock it therein under the locking member;

said compressors have inner ends pivotably mounted along predetermined axes, and have outer ends close enough to the path of said punch to engage opposite sides of the locking member, said axes positioned so that, as the outer ends of the compressors move with the locking members towards the hub slot, said outer ends move progressively closer together to compress the locking member between them.

6. Apparatus for installing a tape leader on a hub that has an undercut slot comprising:

a locking member of resilient material having a greater uncompressed width than the top of said slot in said hub;

a punch moveable toward said hub slot to press said locking member into said hub slot;

a pair of compressors on either side of the path of said punch, for holding said locking member compressed at a location adjacent to said slot to permit said punch to press said locking member into said slot; and means for holding said tape leader over said hub slot, in the path of said locking member, so that as the locking member enters the slot it pushes a portion of the leader into the slot to lock it therein under the locking member;

said compressors have substantially straight outer ends, and said compressors are pivotally mounted to move between a first position wherein the space between said outer ends is tapered with the small end nearest said hub slot, and a second position wherein said outer ends are substantially parallel and lie adjacent to said hub.

7. Apparatus for installing a tape leader on a hub that has an undercut slot, comprising:

means for holding the tape leader over the hub slot;

a pair of compressing means for pressing on opposite sides of a resilient locking member to establish it at a reduced width at a location adjacent to said hub slot but on a side of said tape leader which is opposite said slot; and means for pressing said resilient member from between said pair of compressing means into said slot;

said pair of compressing means include a pair of compressor members with ends for engaging opposite sides of said locking member, said compressor members being pivotally mounted so their ends are progressively closer together as they move towards said hub slot, at least at the portion of their ends which are furthest from said hub slot.

8. Apparatus for installing a tape leader on a hub that has an undercut slot comprising:

a locking member of resilient material having a greater uncompressed width than the top of said slot in said hub;

a punch movable toward said hub slot to press said locking member into said hub slot;

a pair of compressors on either side of the path of said punch, at least one of said compressors being pivotally mounted to move towards said hub slot, said compressors holding said locking member compressed at a location adjacent to said slot to permit said punch to press said locking member into said slot;

means for holding said tape leader over said hub slot, in the path of said locking member, so that as the locking member enters the slot it pushes a portion of the leader into the slot to lock it therein under the locking member;

a cutoff blade coupled to one of said compressors, and positioned over a side of the slot, to cut said leader at a location thereof which lies at the entrance of the slot, as said compressor pivots toward the hub slot.

9. Apparatus for installing a tape leader on a hub that has an undercut slot comprising:

a locking member of resilient material having a greater uncompressed width than the top of said slot in said hub, said locking member comprising a section of a long tube of resilient material;

a punch movable toward said hub slot to press said locking member into said hub slot;

a pair of compressors on either side of the path of said punch, said compressors holding said locking member compressed at a location adjacent to said slot to permit said punch to press said locking member into said slot;

means for holding said tape leader over said hub slot, in the path of said locking member, so that as the locking member enters the slot it pushes a portion of the leader into the slot to lock it therein under the locking member; and a cutting blade located beside the path of said locking member, to sever it from the rest of said long tube as it approaches said hub slot.

* * * * *